(12) United States Patent
Leddy et al.

(10) Patent No.: US 7,585,543 B2
(45) Date of Patent: Sep. 8, 2009

(54) MAGNETIC MATERIALS AND METALLIC PARTICLES AND METHODS OF MAKING SAME

(75) Inventors: Johna Leddy, Iowa City, IA (US);
Shelley D. Minteer, Pacific, MO (US);
Wayne L. Gellett, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 568 days.

(21) Appl. No.: 10/363,996

(22) PCT Filed: Jun. 19, 2001

(86) PCT No.: PCT/US01/19368

§ 371 (c)(1),
(2), (4) Date: Jun. 23, 2004

(87) PCT Pub. No.: WO01/99127

PCT Pub. Date: Dec. 27, 2001

(65) Prior Publication Data

US 2004/0234767 A1    Nov. 25, 2004

Related U.S. Application Data (60) Provisional application No. 60/212,630, filed on Jun. 19, 2000.

(51) Int. Cl.
*B05D 7/14* (2006.01)
(52) U.S. Cl. .................................. 427/215; 427/220
(58) Field of Classification Search ............ 106/287.11; 427/220, 216
See application file for complete search history.

(56) References Cited

U.S. PATENT DOCUMENTS

| | | | |
|---|---|---|---|
| 4,680,140 A | 7/1987 | Kageyama | |
| 4,695,392 A * | 9/1987 | Whitehead et al. | 252/62.54 |
| 5,232,782 A * | 8/1993 | Charmot | 428/405 |
| 5,610,274 A * | 3/1997 | Wong | 530/334 |
| 5,786,040 A | 7/1998 | Leddy et al. | |

(Continued)

FOREIGN PATENT DOCUMENTS

EP        5902380 1        2/1984

(Continued)

*Primary Examiner*—Michael Cleveland
*Assistant Examiner*—Robert Vetere
(74) *Attorney, Agent, or Firm*—Foley & Lardner LLP (57) ABSTRACT

New magnetic materials and new metallic particles, new methods of making and using same, for example, to prepare magnetically modified electrodes and fuel cells, and coated metallic particles in general. The present invention discloses methods of preparation of cheaper and more uniformly sized magnetic and metallic microparticles formed from the exemplary materials magnetite, nickel, samarium cobalt and neodymium iron boron. In addition, the present invention discloses methodology for preparation and use of coated magnetic and metallic microparticles, in particular, exemplary siloxyl coating of magnetic particles, metallic particles, and magnetic and metallic microparticles with an exemplary silane, 3-aminopropyltrimethoxysilane, that is cross linked thereon. In addition, methods and results are described for preparing and using larger siloxyl coated samarium cobalt milliparticles. Coated magnetic milliparticles and magnetic microparticles are useful as component of composites that are applied to electrodes to alter electrochemical fluxes across those electrodes, as well as to alter chemical reactions on surfaces of those electrodes, when magnetically susceptible reactions occur there.

18 Claims, 9 Drawing Sheets

U.S. PATENT DOCUMENTS

| | | | |
|---|---|---|---|
| 5,928,804 A | 7/1999 | Leddy et al. | |
| 6,265,615 B1* | 7/2001 | Kaner et al. | 564/424 |
| 6,569,630 B1* | 5/2003 | Vivekananda et al. | 435/6 |
| 2005/0194588 A1* | 9/2005 | Sasaki et al. | 257/40 |
| 2006/0037912 A1* | 2/2006 | Wertsching et al. | 210/681 |

FOREIGN PATENT DOCUMENTS

| | | |
|---|---|---|
| EP | 08259847 | 10/1996 |
| EP | 0853994 A1 | 7/1998 |
| JP | 08259847 * | 10/1996 |
| WO | 97/33713 | 9/1997 |

* cited by examiner

MAGNETIC MATERIALS AND METALLIC PARTICLES AND METHODS OF MAKING SAME

This application claims priority to PCT/US01/19368, filed Jun. 19, 2001, published on Dec. 27, 2001, Publication No. WO 01/99127 A2 in the English language and which claimed priority to U.S. Provisional Application Ser. No. 60/212,630, filed Jun. 19, 2000.

BACKGROUND OF THE INVENTION

1. Field of the Invention

The present invention relates generally to new magnetic materials and new metallic particles, and methods for their manufacture. In particular, the present invention relates to new magnetic materials and new metallic particles, methods of making them (including methods of siloxyl coating them), and methods of using them, for example, to prepare magnetically modified electrodes for fuel cells, electrolytic cells, and batteries that thereby benefit from resulting enhanced or otherwise beneficially altered function.

2. Background of the Related Art

Commercially available paramagnetic microparticles are expensive and not of uniform size. For example, the paramagnetic microparticles are reported to be 1-2 µm in diameter, but microscopy indicates they are 0.1-10 µm in diameter. In addition, each batch has a different magnetic content. These variations in size and magnetic field strength introduce additional experimental variables that diminish reproducibility and greatly reduce experimental precision. Paramagnetic microparticles can cost approximately $400 per gram. Although this figure may not be great when modifying small 0.45 cm$^2$ electrodes with 3-6 µm thick composites, it becomes significant when the magnetic microparticles are used in larger industrial and commercial applications.

Therefore, a need exists for new magnetic micromaterials and new metallic materials generally, such as magnetic microparticles and metallic microparticles, that are fabricated with more uniformity. In addition, a need exists for new magnetic micromaterials, such as magnetic microparticles, that have higher magnetic field strengths in order to more greatly facilitate magnetically susceptible chemical reactions and other magnetically susceptible processes. In this regard, a need exists for magnetic microparticles with thinner coatings to permit advantageous use of their magnetic fields, which taper off with distance by a function of the inverse cube of the distance x from the particle: $X^{-3}$. Furthermore, a need exists for a method of coating metallic particles in general, for example, to prevent oxidative and other detrimental surface processes and reactions.

The following United States and PCT patent documents to Leddy, et al., are hereby incorporated by reference in their respective entireties: U. S. Pat. Nos. 5,786,040, 5,817,221, 5,871,625, 5,928,804, 5,981,095,and 6,001,248; U. S. patent application Ser. Nos. 08/429,931, now U.S. Pat. No. 5,535,889, Ser. No. 09/047,494, now U.S. Pat. No. 6,322,676, Ser. No. 09/122,861, now U.S. Pat. No. 6,375,885, Ser. No. 09/362,495, now U.S. Pat. No. 6,207,313,Ser. No. 09/429,931,now U.S. Pat. No. 6,355,166,and Ser. No. 09/458,058, now U.S. Pat. No. 6,303,242; PCT Application Nos. PCT/US00/15041 and PCT/US00/28242; and Provisional Patent Application Nos. 60/212,630, 60/208,322, 60/159,374, and 60/139,318.

The above references are incorporated by reference herein where appropriate for appropriate teachings of additional or alternative details, features and/or technical background.

SUMMARY OF THE INVENTION

An object of the present invention is to provide solutions to the above described disadvantages of prior art metallic particles and magnetic particles, and to provide at least the advantages described hereinafter.

In particular, it is an object of the present invention to provide micromaterials and magnetic microparticles as well as a methodology for producing micromaterials, including magnetic microparticles, that have a high degree of uniformity.

It is another object of the present invention to provide micromaterials and magnetic microparticles as well as a methodology for producing micromaterials, including magnetic microparticles, that have a low variability as to particle size.

It is another object of the present invention to provide micromaterials and magnetic microparticles as well as a methodology for producing micromaterials, including magnetic microparticles, that have a low variability as to magnetic field strength.

It is another object of the present invention to provide micromaterials and magnetic microparticles as well as a methodology for producing micromaterials, including magnetic microparticles, that have a relatively uniformly high magnetic field strength.

It is another object of the present invention to provide micromaterials and magnetic microparticles as well as a methodology for producing micromaterials, including magnetic microparticles, that simultaneously have low variability as to particle size, low variability as to magnetic field strength, and relatively uniformly high magnetic field strength.

It is another object of the present invention to provide micromaterials and magnetic microparticles as well as a methodology for producing metallic micromaterials, including metallic microparticles, that have a high degree of uniformity.

It is another object of the present invention to provide micromaterials and magnetic microparticles as well as a methodology for producing metallic micromaterials, including metallic microparticles, that have a low variability as to particle size.

It is another object of the present invention to provide micromaterials and metallic microparticles with at least one chemically inert coating as well as a methodology for producing at least one coating on micromaterials, including on magnetic microparticles and on metallic microparticles generally, to prevent or at least retard surface oxidative processes and surface reactions and surface processes in general, including dissolution, decomposition and any chemical reaction thereat.

It is another object of the present invention to provide micromaterials and metallic microparticles with at least one chemically inert coating as well as a methodology for producing at least one chemically inert coating on micromaterials, including on magnetic microparticles and on metallic microparticles generally, to prevent or at least retard surface oxidative processes and surface reactions and surface processes in general, including dissolution, decomposition and any chemical reaction thereat.

It is another object of the present invention to provide micromaterials and metallic microparticles with at least one chemically inert coating of a siloxyl as well as a methodology for producing at least one chemically inert coating of a siloxyl on micromaterials, including on magnetic microparticles and on metallic microparticles, to prevent or at least retard surface oxidative processes and surface reactions and surface processes in general, including dissolution, decomposition and any chemical reaction thereat.

It is another object of the present invention to provide a methodology for producing at least one chemically inert coating of cross linked 3-aminopropyltrimethoxysilane (or other X—$C_x$-trialkoxysilane, as defined herein) on micromaterials, including on magnetic microparticles and on metallic microparticles generally, to prevent or at least retard surface oxidative processes and surface reactions and surface processes in general, including dissolution, decomposition and any chemical reaction thereat.

It is another object of the present invention to provide metallic microparticles and magnetic microparticles with at least one chemically inert coating that prevents or at least retards surface oxidative processes and surface reactions and surface processes in general, including dissolution, decomposition and any chemical reaction thereat.

It is another object of the present invention to provide metallic microparticles and magnetic microparticles with a siloxyl coating that prevents or at least retards surface oxidative processes and surface reactions and surface processes in general, including dissolution, decomposition and any chemical reaction thereat.

It is another object of the present invention to provide metallic microparticles and magnetic microparticles with at least one chemically inert coating of cross linked 3-aminopropyltrimethoxysilane (or other X—$C_x$-trialkoxysilane, as defined herein) on micromaterials, including on magnetic microparticles and on metallic microparticles generally, to prevent or at least retard surface oxidative processes and surface reactions and surface processes in general, including dissolution, decomposition and any chemical reaction thereat.

It is another object of the present invention to provide metallic microparticles and magnetic microparticles with at least one covalently bound siloxyl coating that prevents or at least retards surface oxidative processes and surface reactions and surface processes in general, including dissolution, decomposition and any chemical reaction thereat.

It is another object of the present invention to provide metallic microparticles and magnetic microparticles with at least one covalently bound siloxyl coating that is cross linked that prevents or at least retards surface oxidative processes and surface reactions and surface processes in general, including dissolution, decomposition and any chemical reaction thereat.

It is another object of the present invention to provide metallic microparticles and magnetic microparticles with a plurality of siloxyl coatings that prevent or at least retard surface oxidative processes and surface reactions and surface processes in general, including dissolution, decomposition and any chemical reaction thereat.

It is another object of the present invention to provide metallic microparticles and magnetic microparticles with a plurality of siloxyl coatings that are cross linked that prevent or at least retard surface oxidative processes and surface reactions and surface processes in general, including dissolution, decomposition and any chemical reaction thereat.

It is another object of the present invention to provide metallic microparticles and magnetic microparticles with a plurality of chemically inert coatings of cross linked 3-aminopropyltrimethoxysilane (or other X—$C_x$-trialkoxysilane, as defined herein) on micromaterials, including on magnetic microparticles and on metallic microparticles generally, to prevent or at least retard surface oxidative processes and surface reactions and surface processes in general, including dissolution, decomposition and any chemical reaction thereat.

It is another object of the present invention to provide magnetic electrodes with enhanced or altered function (depending on the particular process) comprising siloxyl coated magnetic microparticles.

It is another object of the present invention to provide a methodology for producing magnetically modified electrodes with enhanced or altered function (depending on the particular process) comprising siloxyl coated magnetic microparticles.

It is another object of the present invention to provide a methodology for enhancing or altering fuel cell electrolysis (depending on the particular process) with siloxyl coated magnetic particles.

It is another object of the present invention to provide a methodology for enhancing or altering electrolytic cell electrolysis (depending on the particular process) with siloxyl coated magnetic particles.

It is another object of the present invention to provide a methodology for enhancing or altering electrolysis (depending on the particular process) at an electrode surface with siloxyl coated magnetic particles.

It is another object of the present invention to provide a magnetically modified fuel cell with enhanced or altered function (depending on the particular process) due to at least one electrode with siloxyl coated magnetic particles.

It is another object of the present invention to provide a magnetically modified fuel cell with enhanced or altered oxidation rates of organic fuels (depending on the particular process) due to at least one electrode with siloxyl coated magnetic particles.

It is another object of the present invention to provide a magnetically modified fuel cell with enhanced oxidation rates of organic fuels as a result of increased tolerance at an anode due to at least one coating thereon containing siloxyl coated magnetic particles.

It is another object of the present invention to provide a magnetically modified fuel cell with enhanced oxidation rates of organic fuels as a result of enhanced oxygen kinetics at a cathode due to at least one coating thereon containing siloxyl coated magnetic particles.

It is another object of the present invention to provide a magnetically modified electrolytic cell with enhanced or altered function (depending on the particular process) due to at least one electrode with siloxyl coated magnetic particles.

It is another object of the present invention to provide a magnetically modified semiconductor electrode with enhanced or altered function (depending on the particular process) due to at least one electrode with siloxyl coated magnetic particles.

It is another object of the present invention to provide a battery with enhanced or altered function (depending on the particular process) due to at least one electrode with siloxyl coated magnetic particles.

It is another object of the present invention to provide a surface coating for particles, wherein the surface coating may simultaneously or subsequently modified by including functional chemical groups, for example, including catalysts, enzymes, enzyme active sites, enzyme regulatory sites, enzyme inhibitory sites, ion exchange molecules, binders, ligand binding sites, hydrophilic molecules, hydrophobic molecules, and combinations thereof.

Additional advantages, objects, and features of the invention will be set forth in part in the description which follows, and in part will become apparent to those having ordinary, skill in the art upon examination of the following, or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein.

DETAILED DESCRIPTION OF PREFERRED EMBODIMENTS

The new magnetic micromaterials of the present invention were prepared by use of a milling process, followed by a siloxyl coating procedure, as described hereinafter. These processes and procedures have applicability to metallic particles generally. Herein, "metallic" is defined to include any element, compound, or mixture that comprises an element that can be a metal, a semi-metal, or a semiconductor; for example, silver and silver chloride are both metallic according to this definition, as are Si and $SiO_2$.

The new metallic and magnetic micromaterials of the present invention have a range of material costs, depending on the specific material. The new metallic and magnetic materials of the present invention include particles made of magnetite and other iron oxides, samarium cobalts of various stoichiometries, nickel, neodymium iron boron, and metallic particles in general.

New magnetic microparticles of the present invention were made by milling metallic or magnetic materials, and then coating the resulting microparticles with silanes to provide a protective siloxyl coating. For reference, Polysciences paramagnetic microparticles are made of iron oxide, and are shrouded in polystyrene. The new magnetic materials of the present invention comprise materials that fall into several categories. Magnetite and iron oxides in general, and samarium cobalt microparticles, for example, are paramagnetic, which means that, once magnetized, they will sustain a magnetic field in the absence of an external magnetic field. Other materials are superparamagnetic, which means that they require an external magnet in order to sustain a magnet field themselves. Superparamagnetic materials also comprise otherwise paramagnetic materials when the particles are sufficiently small (<or ≈0.5 μm), so that they are not capable of sustaining a magnetic field in the absence of an external magnet. Samarium cobalt magnets are very strong rare earth magnets, but are not as strong as neodymium iron boron magnets. The silane chemisorption methodology of the present invention has been used to produce a chemically inert protective coating for neodymium iron boron when at least two coatings are applied onto such particles. On the other hand, the silane chemisorption methodology of the present invention has been found to be effective with application of a single coating on samarium cobalt, magnetite, and nickel microparticles, as herein below described.

Figure 1:
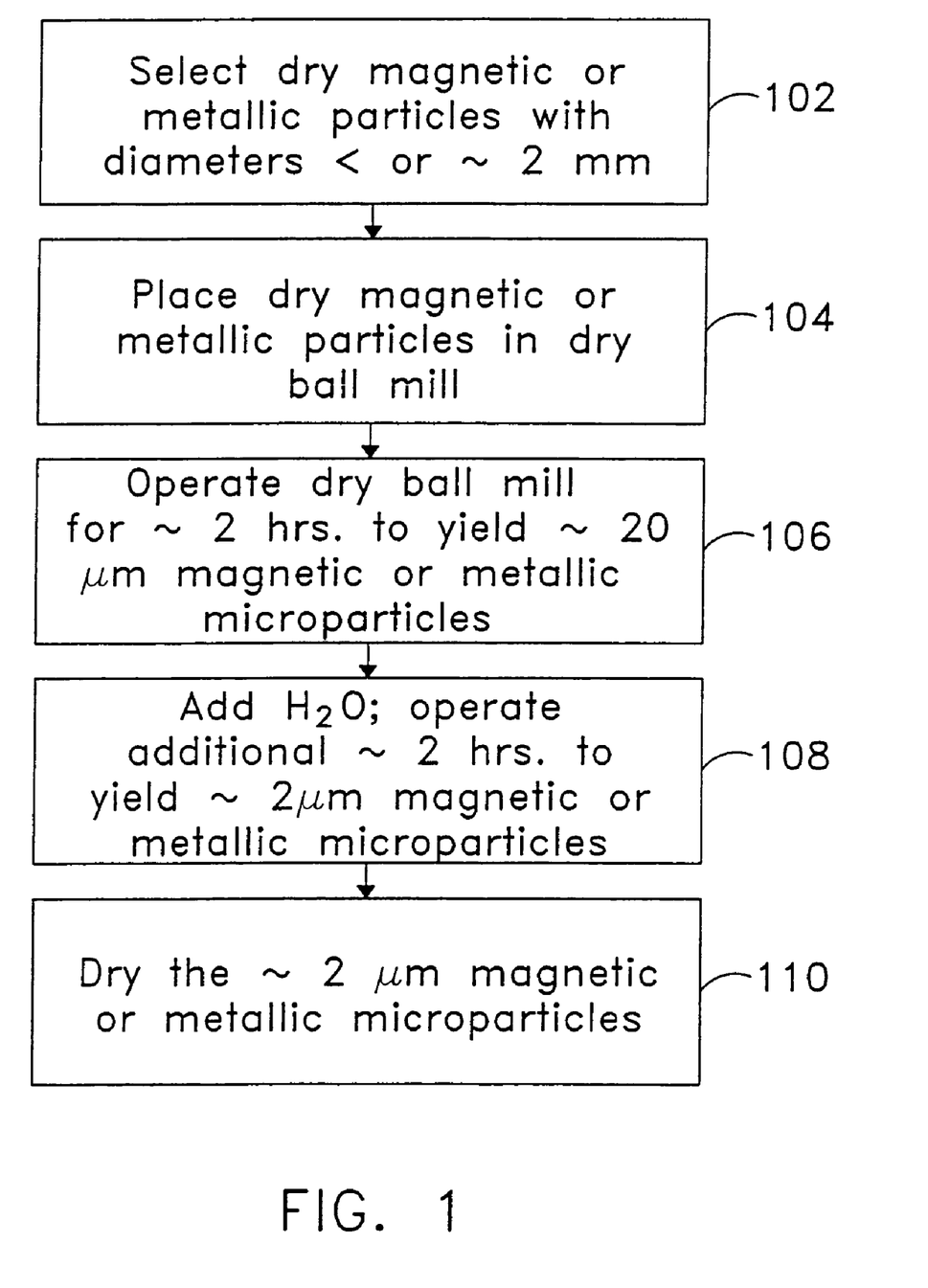
FIG. 1 outlines steps used to prepare magnetic microparticles (samarium cobalt, magnetite, nickel, and iron oxides in general, as well as metallic and non-metallic microparticles in general)

Microparticles. In a preferred embodiment, magnetic microparticles and metallic microparticles are made (as is outlined in FIG. 1) by milling magnetic or metallic materials to diameters of about 5 μm (usual diameter range ~2 to ~10 μm, with outside limits of ~0.1 to ~20 μm) using, for example, a Brinkmann Centrifugal Ball Mill Model S1000. A roughly 10 mL volume of dry magnetic or metallic material with initial material sizes having diameters of less than about 2 mm is selected 102, placed in a dry ballmill 104, and ground in a 50 mL zirconia grinding set (zirconia internal surface, plus zirconia grinding balls) for about 2 hours at a turntable speed setting of about 85 106. This produces particles with a diameter of about 20 μm. Then, to produce smaller microparticles, 2-3 mL of 18 MΩ water is added to the magnetic or metallic material in the zirconia jar, and the magnetic or metallic material is ground for an additional roughly 2 hours at a turntable speed setting of about 85 (which is a setting for the Model S1000) 108. The magnetic or metallic material is then allowed to dry by vacuum dessication ($10^{-4}$ torr; however, other values can be used in the procedure) or other drying procedure 110, and subsequently is removed from the zirconia jar. This produces particles with a diameter of about 5 μm (outside range about 0.1 to about 20 μm). The zirconia jar and grinding balls are washed thoroughly with 18 MΩ water, and dried before new magnetic or metallic samples are introduced. Materials other than zirconia are contemplated for this methodology, as long as they are harder than the particles being milled.

This procedure is appropriate for smaller laboratory uses. However, larger industrial uses will benefit from scaled-up procedures, in which, for example, larger dry ball mills are used, and the starting dry magnetic or metallic particles are larger, for example, 2-3 cm in diameter. Milling times are generally longer than the above when the starting materials have larger diameters. In addition, this procedure (either the laboratory scale or the industrial scale procedure) can be used advantageously for preparation of metallic microparticles in general, not just for magnetic microparticles.

This methodology was applied to the magnetic materials samarium cobalt ($Sm_2Co_7$; Aldrich) and magnetite (Aldrich). Unmagnetized nickel powder of roughly 2-3 μm diameter (Novamet) was used without milling. Information on these magnetic materials is provided in Table 1. The nickel powder is a porous filamentary powder, so actual particle density is much less than the density of nickel metal given in Table 1. The magnetite ($Fe_3O_4$) and samarium cobalt ($Sm_2Co_7$) materials, purchased without external magnetization, are inherently magnetizable materials. Other iron oxides and samarium cobalt materials will benefit also from the siloxyl coating procedure of the present invention.

TABLE 1

Magnetic Material Properties

| Magnetic Microparticle | Density(g/cm$^3$) | Magnetic Energy Product (MGo) |
|---|---|---|
| Samarium Cobalt (Sm$_2$Co$_7$) | 8.3 | 12-18 |
| Magnetite (Fe$_3$O$_4$) | 5.18 | 1-5 |
| Nickel (Ni) | 8.9 | <1 |

Figure 2:
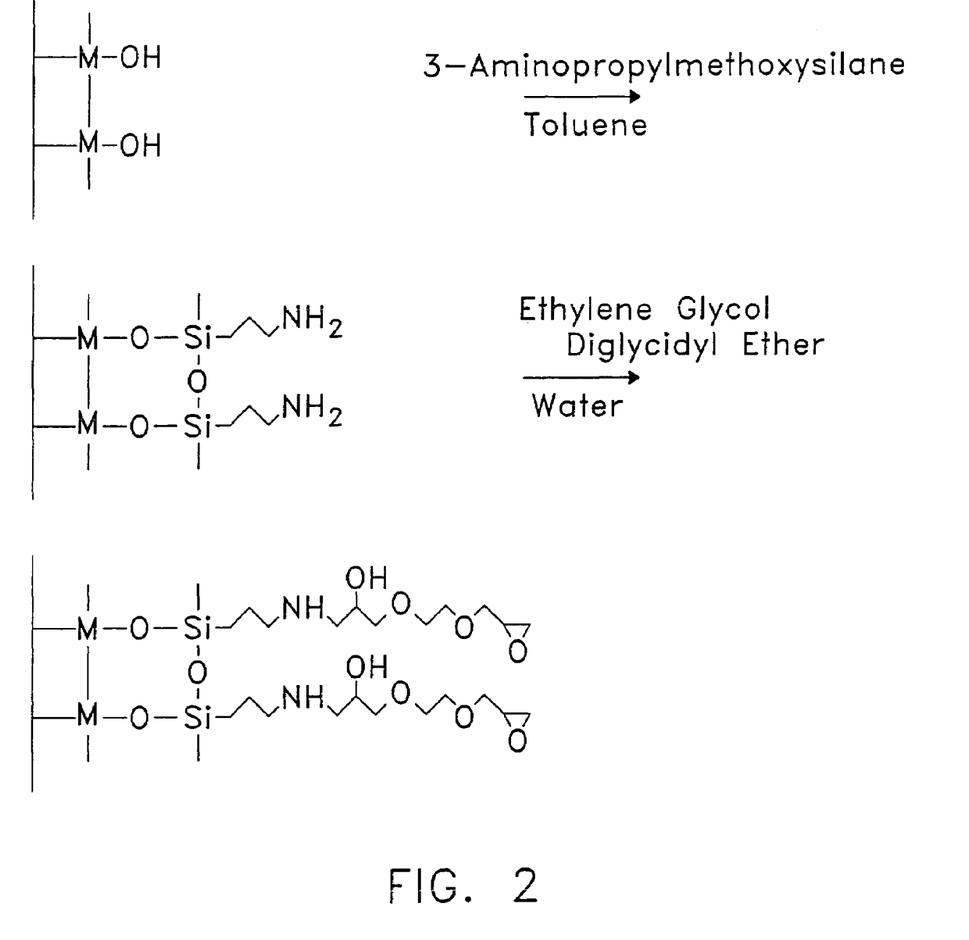
FIG. 2 summarizes the basic chemistry of the siloxyl coating procedure.

Chemical Coating. Because these magnetic materials corrode (as do metallic particles in general), it was necessary to shroud the magnetic and metallic microparticles in at least one chemically inert protective coating [A. Heller 1997, personal communication; K. Emoto, J. M. Harris & J. M. V. Alstine 1996, *Anal. Chem.* 68: 3751-3757], where "chemically inert" can mean relatively chemically inert, for example, to allow chemical attachment of selected chemical moieties of any desired sort. In a preferred embodiment, this procedure (see FIG. 2 for the general chemical concept of the procedure; see FIG. 3 for steps of the procedure) is commenced by mixing the magnetic or metallic microparticles (about 1 gram of microparticles in about 25 mL of solution; relative amounts may be varied according to a particular use) in a roughly 50/50 (v/v) solution of 3-aminopropyltrimethoxysilane (Aldrich)/toluene (generally, an X—C$_x$-trialkoxysilane in an aromatic organic solvent, including in multicyclic aromatics and heterocyclic aromatics, or in a saturated or unsaturated alkane of C$_5$ or longer) 302, and vigorous shaking or shaking by hand [with frequent inversions (roughly one inversion per second) to maintain the magnetic microparticles in suspension when a vigorous shaking protocol is not used] for about 4 hours when the procedure is conducted at room temperature (roughly 17° C. to about 25° C. 304. Higher temperatures suffice for the reaction, as long as the mixture/suspension does not boil, which is a function of the organic solvent's boiling point. Thus, temperature ranges at least as high as 70° C. to 140° C. are possible for this reaction, depending upon the choice of organic solvent with an appropriate boiling point. The relative volumes of silane/organic solvent, and microparticles/solution of silane/organic solvent, are governed by the relative amounts of reactive silane groups to oxide and/or hydroxide groups on the metallic or magnetic microparticles; in particular, there should be an excess of reactive silane groups over the number of reactive oxide and/or hydroxide groups with which siloxyl covalent bonds are to take place.

Figure 3:
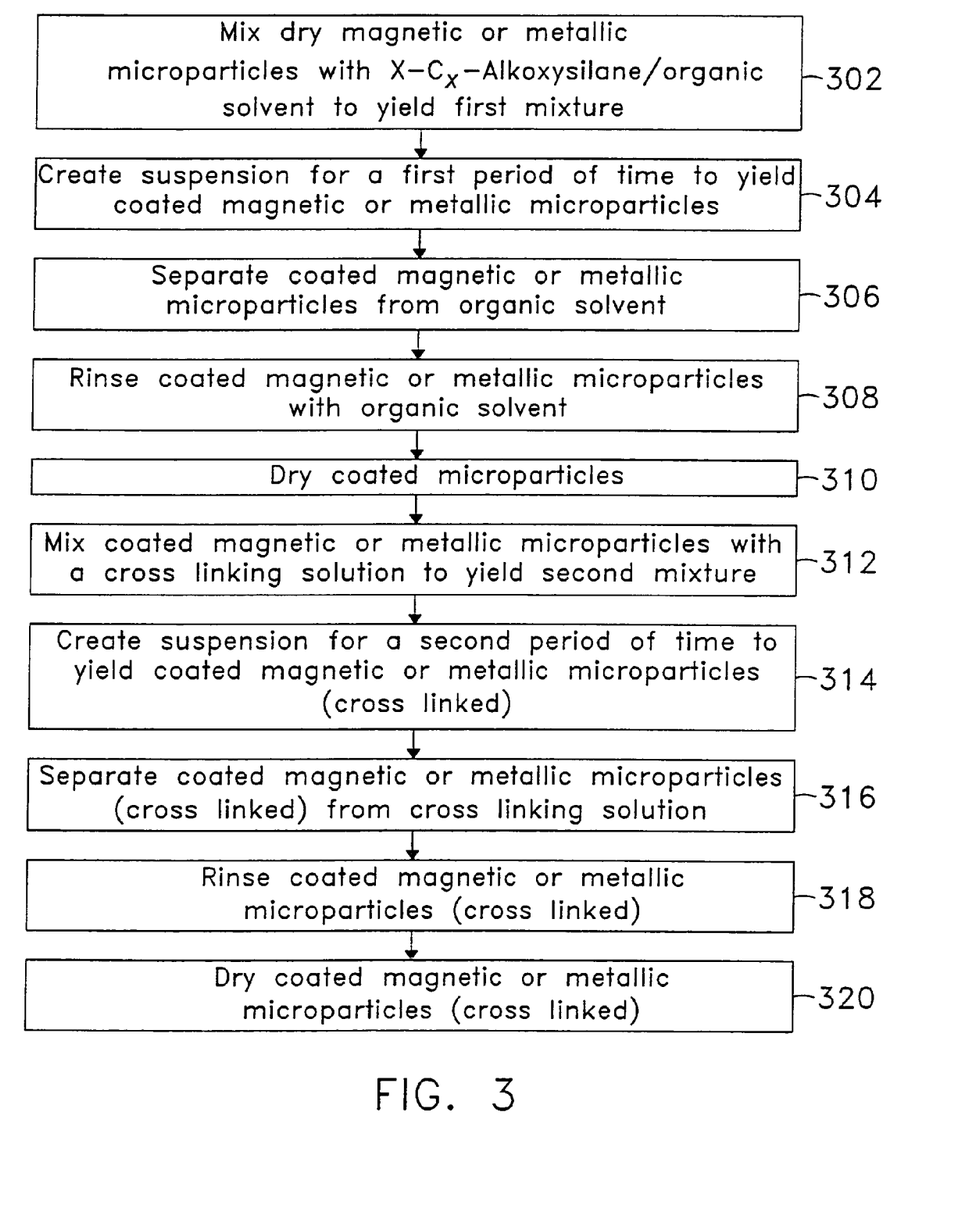
FIG. 3 outlines steps of the siloxyl coating procedure.

FIG. 3 displays the general formula for a suitable silane according to the present invention, X—C$_x$-trialkoxysilane, where X is a cross linkable group, for example, an amide, an amino, a thiol, a chloro, a bromo, an iodo, a thiol, a carboxy, an aldehyde, an alcohol, an alkoxy, a sulfonyl, a carbonyl, a methacryl, a nitrile, or other similarly reactive group, and where each X group is matched with a cross linking agent that is reactive toward that X group; x can equal from 1 to about 20; CV is a linear or branched carbon chain that is saturated or unsaturated, and that also can comprise a cyclic group with the proviso that the cyclic group must be separated from the trialkoxysilane moiety by a carbon chain that is at least 2 carbons in length; and trialkoxysilane comprises alkoxy groups that independently can be methoxy, ethoxy, propoxy, butoxy, pentoxy, hexoxy, heptoxy, or phenoxy (which may optionally be substituted). Room temperature encompasses a temperature range from about 17° C. to about 25° C. "Frequent inversions" are roughly an inversion per second, though a range from about an inversion per 2 or 3 seconds to 2-4 inversions per second provide adequate maintenance of a suspension to promote siloxyl coating of the magnetic microparticles, metallic microparticles, or other particles. The magnetic microparticles, metallic microparticles, or other particles are then allowed to settle and the supernate decanted 306, and rinsed several times with toluene or other organic solvent (such as an aromatic organic solvent, including multicyclic aromatics and heterocyclic aromatics, such as xylene, benzene, substituted benzenes, etc.) or with a saturated or unsaturated alkane of C$_5$ or longer (preferably saturated) 308, and dried by dessication (for example, by vacuum dessication) or other drying procedure 310. The magnetic or other metallic particles can be separated from the organic solvent by methods other than settling and decanting of supernate, for example, filtration, centrifugation, use of a magnet, etc. Once dry, the magnetic microparticles are suspended in a roughly 50/50 (v/v) cross linking solution of about 50% purity cross linking agent ethylene glycol diglycidyl ether (Aldrich)/water 312, and vigorously shaken or shaken by hand [with frequent inversions (about once per second; see above) to maintain the magnetic microparticles in suspension] for about 4 hours when the procedure is executed at room temperature (range from about 17° C. to about 25° C.) 314. The phrase "cross linking solution" means a solution comprising at least one cross linking agent, and also includes a pure cross linking agent. Higher temperatures may be employed, for example, at least as high as about 70° C. Other cross linking agents can be utilized advantageously in this procedure, for example, ethylene glycol dimethacrylate, 2-ethylhexyl glycidyl ether, ethylene glycol bis [pentakis (glycidyl allyl ether)] ether, 1,4-butanediol glycidyl ether, 4-tert-butyl phenyl glycidyl ether, N,N'-bis(acryloyl) cystamine, nitrilotriacetic acid tri(N-succinimidyl) ester, and 4-azidophenyl isothiocyanate, as long as they are reactive toward the X group of the X—C$_x$-trialkoxysilane. Each cross linking agent will have a preferred temperature range and set of reaction conditions. The cross linking reaction is typically run in an aqueous solution. The relative volume of cross linking solution to microparticles may be varied, and are selected so that there is roughly an equality between number of cross linking groups and reactive X groups, or an excess number of cross linking groups over the number of reactive X groups. The resulting coated (and cross linked) magnetic microparticles or metallic microparticles are then allowed to settle and the supernate decanted (or other separation procedure, as indicated above) 316, and the magnetic microparticles rinsed several times with 18 MΩ water 318, and dried by dessication or other drying procedure 320.

Figure 4:
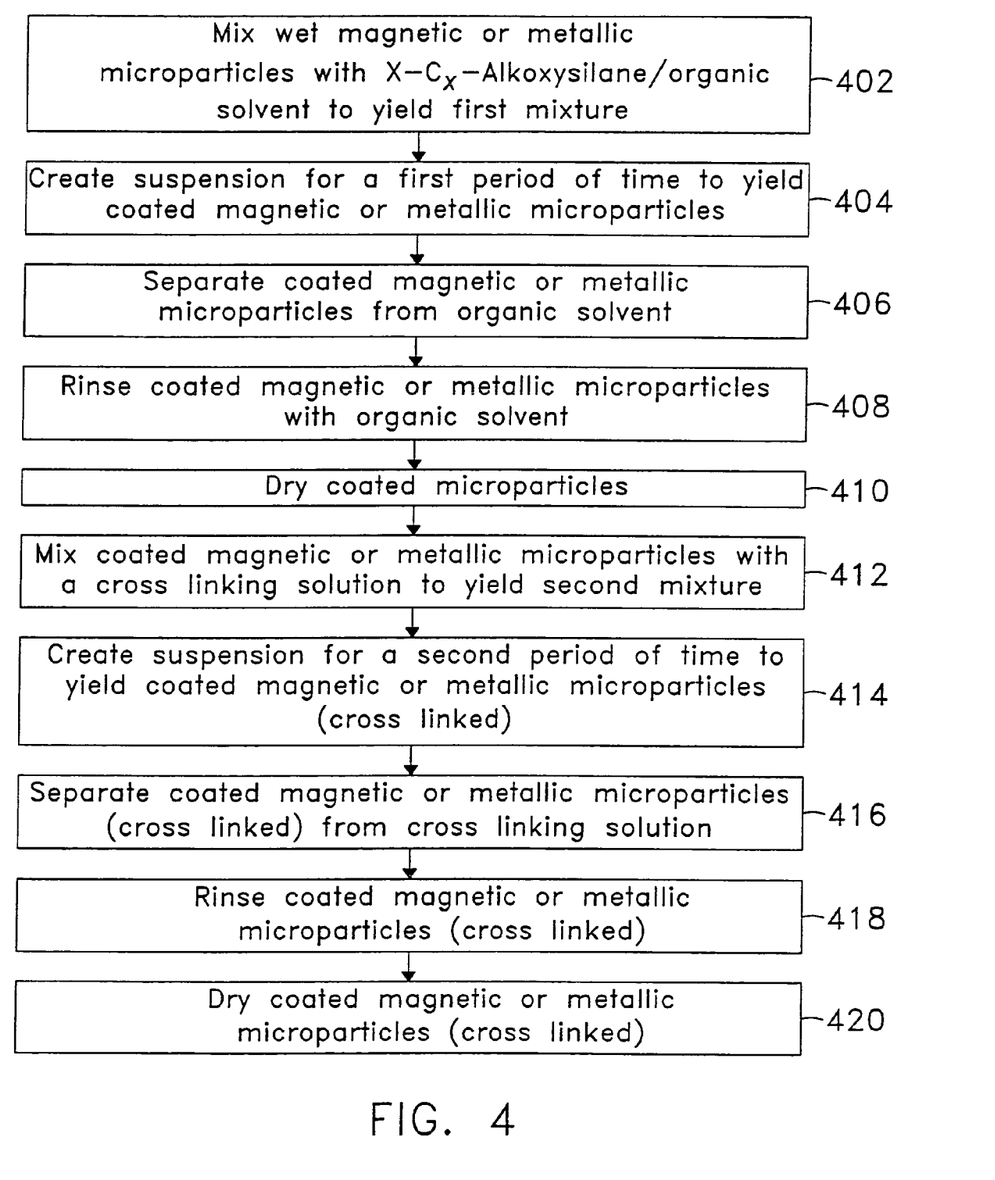
FIG. 4 outlines steps for preparation of siloxyl coated large samarium cobalt milliparticles.

As is summarized in FIG. 4, large samarium cobalt milliparticles are prepared in the same way as the microparticles except that the milliparticles are wet/damp at commencement of the coating process 402. When the magnetic microparticles are wet/damp at time of introduction to the aminopropyltrimethoxysilane/toluene mixture (or, generally, amino-C$_x$-alkoxysilane in an organic solvent, as described above), they clump or coagulate to form larger milliparticles during the shaking/suspension process 404. Thus, these larger milliparticles can constitute an agglomeration of small microparticles; alternatively, a samarium cobalt milliparticle also can constitute a single large milliparticle. The other steps (406, 408, 410, 412, 414, 416, 418, and 420, respectively) are identical to respective even numbered steps 306 to 320 of FIG. 3.

A resulting single siloxyl coating on the magnetic microparticles or other particles is in the range of about 10 Angstroms to about 30 Angstroms thick.

For many kinds of particles, a single coating suffices. The process may be repeated to form one or more additional coatings, as is necessary with neodymium iron boron particles. With neodymium iron boron microparticles, a single siloxyl coating procedure results in uncoated projections that are readily reactive in an appropriate solution; whereas application of a second siloxyl coating procedure produces neodymium iron boron microparticles that are fully resistant to surface reactions, including in a Nafion® testing suspension (superacid; see below). However, an improved procedure introduces an additional step that produces a more stable second coat, namely, a heating step that follows the first coating, and before application of the second coating: the single coated neodymium iron boron particles are annealed by heating to a temperature less than the curie temperature (the temperature at which magnetic properties are lost by the particular material). An exemplary additional step is to heat the single coated neodymium iron boron particles to about 450° C. (± about 20 to 30° C.) in a nitrogen atmosphere for about an hour (could be varied between about half an hour and about 2 hours). This step drives off —OH and $H_2O$ groups, and produces a glassy like first coating. Upon cooling, the single coated particles can then be subjected to the same procedure that was used to produce the first coating.

Preparation of Composites. Composites are formed by co-casting a 5% by weight (w/w) suspension of Nafion® 1100 in lower aliphatic alcohols (Aldrich) and the siloxyl coated magnetic microparticles. For iron oxide microparticles, the volumes of the coated magnetic microparticles and the Nafion®/lower aliphatic alcohol solution are selected so as to yield a dry composite with about 15% by volume as siloxyl coated magnetic microparticles, and about 85% as Nafion®. When the volume of microparticles in the dry composite is less than about 7.5%, the composites do not produce sufficiently large magnetic field effects. When the volume of microparticles in the dry composite is more than about 20%, the composites are prone to cracking. The preferred range for the volume of iron oxide microparticles in the dry composite is about 9% to about 19%. However, note that the beneficial volume range for the dry composite will vary according to the magnetic field strength of the particles, as well as the size of the particles. For example, when neodymium iron boron magnets (with stronger magnetic fields) are used, the preferred volume range for the dry composite may vary from about 5% to more than 20%, for example, to about 30%.

To test the stability of resulting microparticles, siloxyl coated magnetic microparticles were placed in a Nafion® suspension (superacid) for a week to see if corrosion would occur. No corrosion was observed either visually or electrochemically.

It is also important to note that ion exchange polymers other than Nafion® may beneficially be used in practice of the present invention, for example, including polystyrene sulfonates, polyvinylpyridines, and Flemion®, etc. In addition, these polymers may be modified by various means to alter physical and chemical properties thereof.

Reagents for Cyclic Voltammetry. Cyclic voltammetry was performed on tris (2,2'-bipyridyl) ruthenium (II) chloride hexahydrate ($Ru(bpy)_3^{+2}$; Aldrich) through the composites. All solutions were made in 18 MΩ (Milli-Q) water. The concentration of the redox species was 1.0 mM with 0.10 M nitric acid electrolyte.

Electrode Preparation for Cyclic Voltammetry. The general procedure followed for preparing a glassy carbon electrode is summarized in FIG. 5. This procedure was applied to a glassy carbon disk working electrode. However, the procedure may equally well be applied to other electrodes that fall within the contemplated scope of application of siloxyl coated magnetic or other particles according to practice of the instant invention, for example, to electrodes made of metals, semi-metals, and semiconductors, including the alkali metals, the alkaline earths, the transition metals, the lanthanides and actinides, the elements of Groups IIIA, IVA, and VIA, including, for example, gold, platinum, palladium, steel, carbon (for example, pyrolytic graphite, vitreous carbon, carbon black, graphite powder, highly ordered pyrolytic graphite, carbon paste, graphite composites, wax impregnated graphite, etc.), lead, iron, copper, aluminum, antimony, chromium, tin, silicon, nickel, germanium, manganese, magnesium, mercury, molybdenum, neodymium, gallium, boron, ruthenium, tungsten, titanium, zinc, and zirconium, including their oxides, nitrides, alloys, chalcogenides, halides, sulfides, selenides, tellurides, phosphides, alloys, and arsenides, etc., and mixtures thereof. The present procedure may also be applied to conducting organic and other polymers, including polyanilines, polypyrroles, polythiophenes, polyacetylenes, and derivatives thereof, as well as polymers comprising such components as graphite fibers, carbon nanotubes, etc. The procedure may be applied to electrodes made of any material that conducts electrons, including, for example, sodium electrodes that are operated in a non-aqueous and non-oxygen environment. The procedure may also be applied to semiconductor electrodes, including doped and intrinsic. The procedure may also be applied to boron nitride electrodes.

Figure 5:
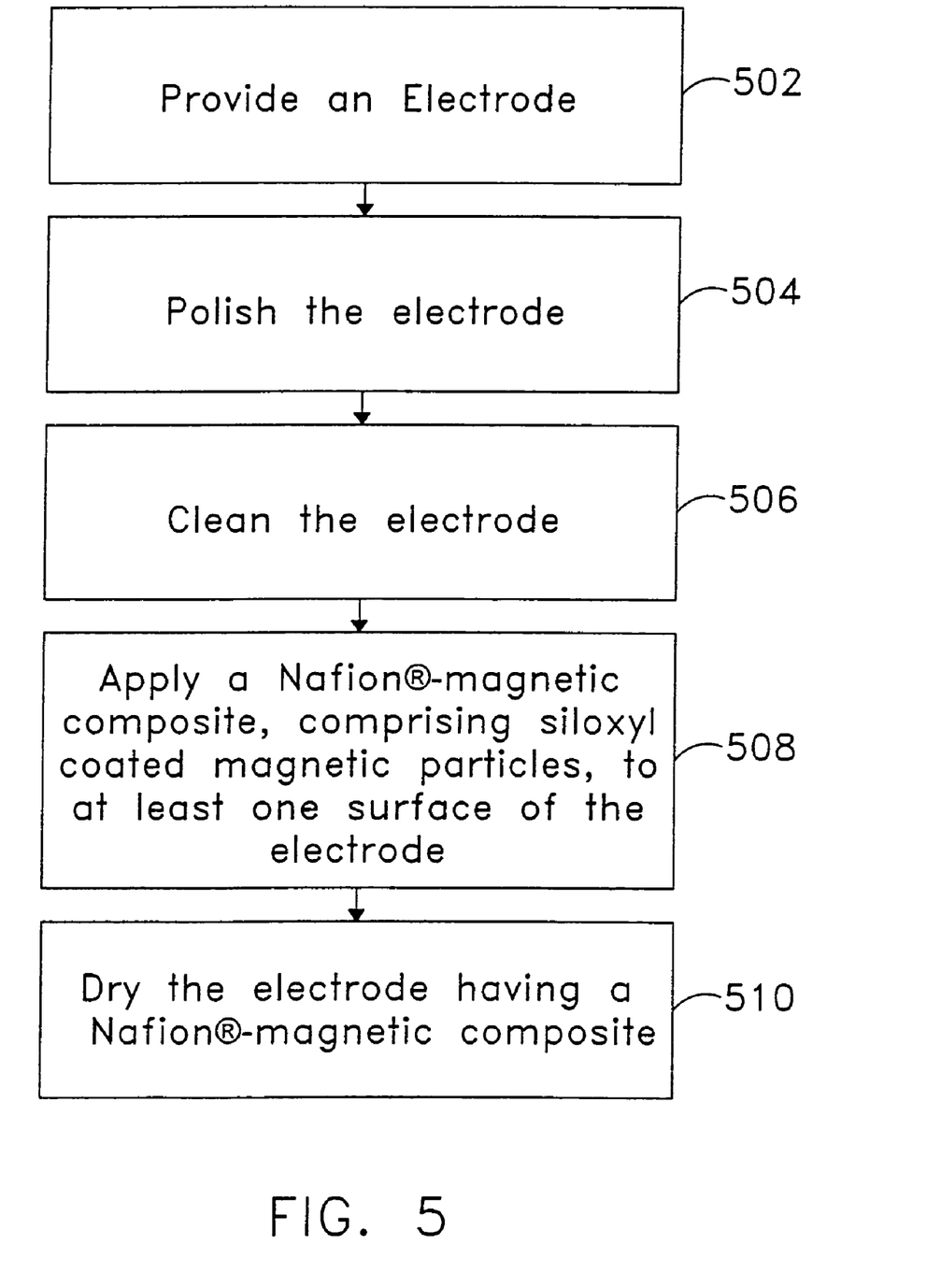
FIG. 5 outlines steps for preparing a magnetic electrode with siloxyl coated magnetic particles.

A glassy carbon disk working electrode was provided 502 (exemplary area =0.459 $cm^2$; however, the general procedure applies to any size of electrode), and was polished 504 successively with 1.0 µm, 0.3 µm, and 0.05 µm alumina on Svelt polishing cloths (Buehler). (Note that different polishing cloths may be used when other electrodes are employed.) The electrode was then cleaned 506 by sonicating for about 5 minutes (range: about 1 to about 20 minutes) in 18 MΩ water to remove remaining alumina, soaking in concentrated nitric acid for about 2 minutes (approximate range: about 1 minute to about 10 minutes), and thoroughly rinsing with 18 MΩ water. With some metallic and other electrodes, dilute nitric acid may be used in place of concentrated nitric acid. The electrode surface was then modified with either a Nafion® film or a magnetic microparticle/Nafion® composite. Nafion® films were prepared by pipetting an appropriate volume of about 5% by weight (w/w) Nafion® solution (the 5% by weight Nafion® polymer is mixed into a solution that is roughly 50% (v/v) 18 MΩ water and roughly 50% lower, straight chain aliphatic alcohols) onto the electrode surface. (Note that Nafion® polymer may also advantageously be mixed with other amounts of aqueous solvent, as well as with other solvents, for example, with an alcohol, in order to change porosity properties of the resulting Nafion®) composite.) The magnetic microparticle/Nafion® composites (containing siloxyl coated magnetic microparticles) were prepared by pipetting an appropriate volume of composite stock solution onto the electrode surface in the presence of an external magnet 508, the shape of which affects the kinds of pillared composite structures that result, as is known in the art. The resulting Nafion(® coated or Nafion®-magnetic composite coated electrode was then dried 510 by vacuum dessication or other drying method. Samarium cobalt composites were handled similarly, except that the electrodes with composite and samarium cobalt were placed in an external magnet of a desired shape (again, shape of magnet being selected based on the desired shape of composite pillars) after the films were dry. The composite stock solution was prepared by adding appropriate fractions of 5% by weight (w/v) Nafion® solution and dry magnetic microparticles (siloxyl coated) together. The fractions are calculated so that the dry composite film is composed of about 15% by volume as siloxyl coated magnetic microparticles (range about 9% to about 19%; see above for notes on other details and other ranges that apply to other magnetic or metallic materials) and about 85% by volume as Nafion®. The film thicknesses were about 5.1 μm.

One exceptional study was performed on an electrode modified with one large samarium cobalt particle. These films were prepared by centering a roughly 1 mm diameter siloxyl coated samarium cobalt particle on the electrode surface, and pipetting the above described 5% by weight (w/w) Nafion® solution over the particle/electrode. Thus, the samarium cobalt particle was suspended on the electrode surface with a Nafion® solution. The samarium cobalt particle was not buried inside the film because the particle was much thicker than the film.

Electrochemical Measurements. The electrochemical flux of $Ru(bpy)_3^{+2}$ through the membrane layer to the electrode surface was studied using cyclic voltammetry. Nafion® film and magnetic microparticle/Nafion® composite modified working electrodes were equilibrated in 1.0 mM $Ru(bpy)_3^{+2}$ and 0.1 M nitric acid for 4 hours before measurements were taken. The reference electrode was a saturated calomel electrode. The counter electrode was a large platinum gauze spot welded to platinum wire. Data were collected and analyzed on a Pentium computer interfaced to a BioAnalytical Systems Model 100B/W Potentiostat. Cyclic voltammetry was performed at scan rates ranging from 50 to 200 mV/s. In cyclic voltammetry, electrochemical flux is determined from the measured peak current ($i_p$) for reversible electron transfers, and the measured peak current is a function of the extraction coefficient (K) and the apparent diffusion coefficient ($D_{app}$) of the redox probe in the composite or film.

$$\text{Flux} = i_p/(nFA) \quad (1)$$

$$i_p = (2.69 \times 10^5) n^{3/2} A D_{app}^{1/2} v^{1/2} \in K C^* \quad (2)$$

where n is the number of electrons transferred, F is Faraday's constant, A is the area of the electrode, v is the scan rate, ∈ is the porosity of the film, and C* is the concentration of $Ru(bpy)_3^{+2}$ in solution. The porosity of Nafion® films and composites consisting of one bead is approximately 1.0, and the porosity of the magnetic composites is about 0.85. Three replicates of each experiment were performed.

Samarium Cobalt. Forming samarium cobalt/Nafion® composites has several engineering problems. Due to the high magnetic field environment of the samarium cobalt magnetic microparticles and the high density of the samarium particles, the samarium cobalt microparticles do not suspend in the Nafion® solution. This causes problems in determining the exact amount of magnetic micromaterial on the electrode surface. Therefore, flux enhancements cannot be quantified with the needed precision. A representative cyclic voltammogram of $Ru(bpy)_3^{+2}$ in a samarium cobalt/Nafion® composite and in a Nafion® film is provided in FIG. 6. Exact flux enhancement values cannot be determined because they require knowledge of porosities, which are unknown because of the inadequate suspension. However, it is evident that these systems do provide much larger flux enhancements than their magnetite counterparts. The peak currents for the silane coated samarium cobalt composites are seven to eight times larger than the Nafion® films. The difference in the peak potentials ($\Delta E_p$) are only 6 mV smaller than the $\Delta E_p$'s for the Nafion® films. However, the peak potentials are asymmetrically shifted by 30 mV. The forward peak potential is shifted +30 mV with respect to Nafion(®, and the backward peak potential is shifted −36 mV with respect to Nafion®. Therefore, $Ru(bpy)_3^{+2}$ is harder to electrolyze in the samarium cobalt composite than it is in Nafion®.

One Samarium Cobalt Particle. The single particle composite experiments are of interest because they show that only small amounts of particle/Nafion® interfaces are necessary to create a significant impact on electrochemical flux.

Figure 7:
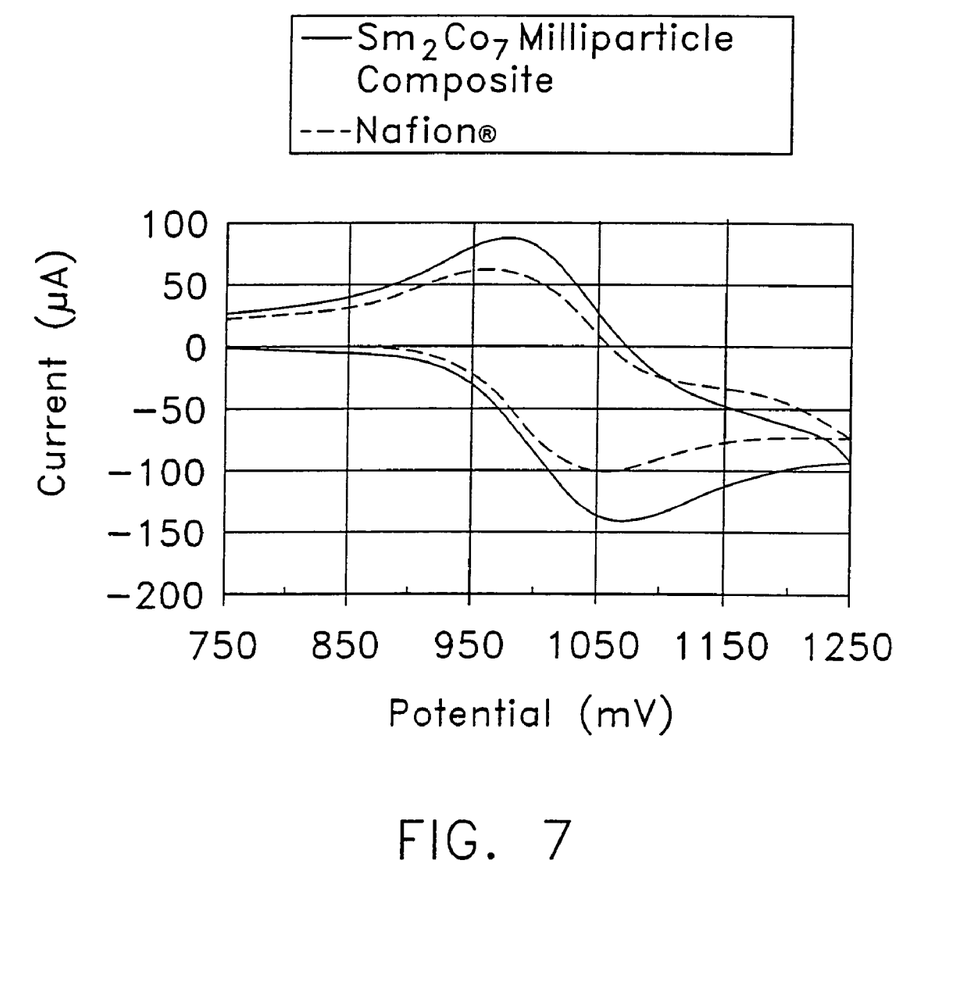
FIG. 7 shows 100 mV/s cyclic voltammograms of tris(2,2'-bipyridyl) ruthenium (II) in a samarium cobalt milliparticle/Nafion® composite and a Nafion® film.

Because magnetic fields increase self-exchange rates by several orders of magnitude, small volumes of magnetic particles can have measurable effects on electrochemical flux. The cyclic voltammetry of $Ru(bpy)_3^{+2}$ in a single samarium cobalt particle/Nafion® composite and a Nafion® film is shown in FIG. 7. The roughly 1 mm diameter (the upper limit is roughly 2 mm in diameter) samarium cobalt particle/Nafion® composite shows lower flux enhancements for $Ru(bpy)_3^{+2}$ than a regular composite. This is expected because there is little bead/Nafion® interface, and because a lower volume percent of the film is in the presence of a high magnetic field. The differences in the peak potentials ($\Delta E_p$) are approximately the same as the $\Delta E_p$'s for the Nafion® films. The peak potentials are asymmetrically shifted by only 15 mV because there is a smaller average magnetic field at the electrode surface. The forward peak potential is shifted +5 mV with respect to Nafion®, and the backward peak potential is shifted −5 mV with respect to Nafion®.

Magnetite. The siloxyl coated magnetite composites are similar in morphology to the Polyscience paramagnetic microparticle composite, except the Polyscience paramagnetic microparticle composites have an orange tint to them, whereas the siloxyl coated magnetite composites are dark black. Siloxyl coated magnetite microparticles comprise black microparticles, and Polyscience paramagnetic microparticles comprise dark orange/brown microparticles. The orange brown coloration is due in part to the thick polystyrene shroud around the Polyscience paramagnetic microparticle, and in part to degradation of magnetite to other forms of iron oxide.

Figure 8:
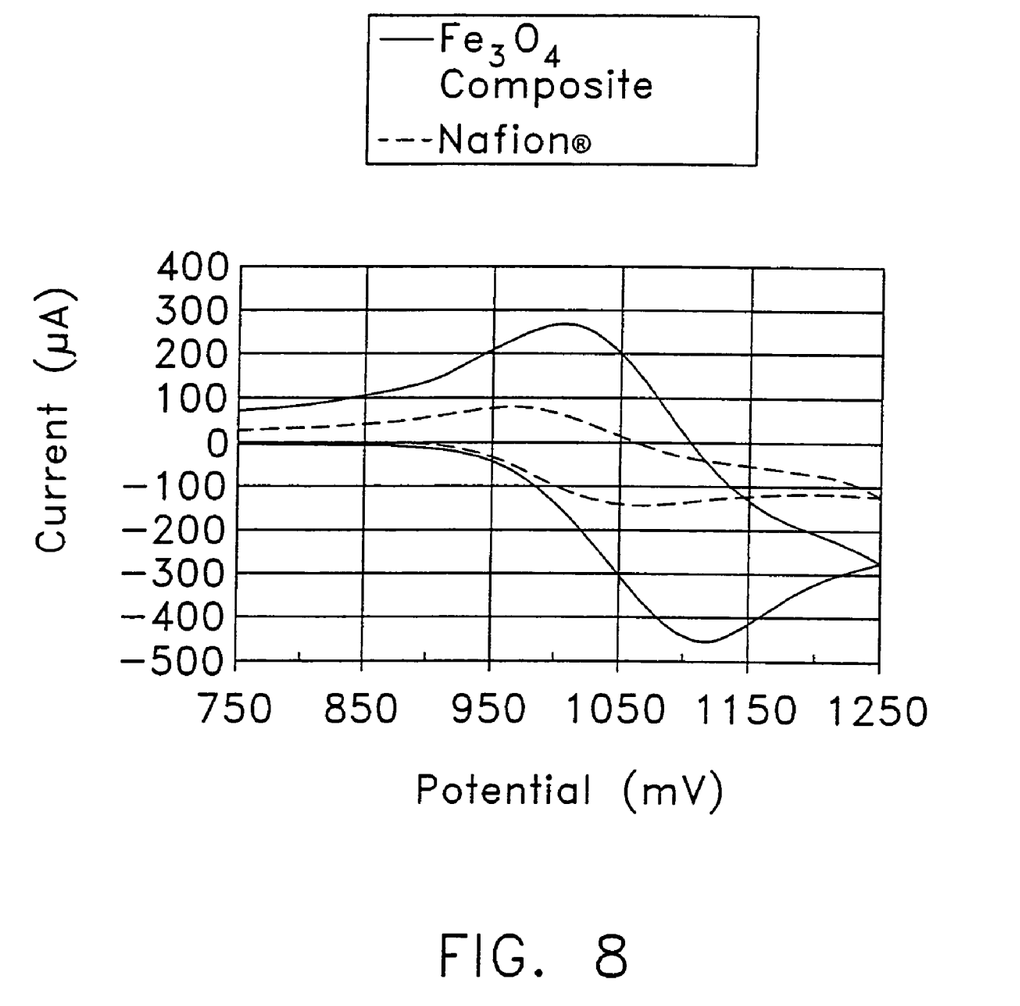
FIG. 8 shows 100 mV/s cyclic voltammograms of tris(2,2'-bipyridyl) ruthenium (II) in a siloxyl coated magnetite microparticle/Nafion® composite and a Nafion® film.

The siloxyl coated magnetite/Nafion® composites show similar enhancements in electrochemical flux as probed by cyclic voltammetry. This can be seen from the cyclic voltammograms of $Ru(bpy)_3^{+2}$ in a siloxyl coated magnetite/Nafion® composite and in a Nafion® film, as is shown in FIG. 8. The differences in the peak potentials ($\Delta E_p$) are 5 mV larger than the $\Delta E_p$'s for the Nafion® films. The forward peak potential is shifted 48 mV with respect to Nafion®, and the backward peak potential is shifted −33 mV with respect to Nafion®.

Figure 9:
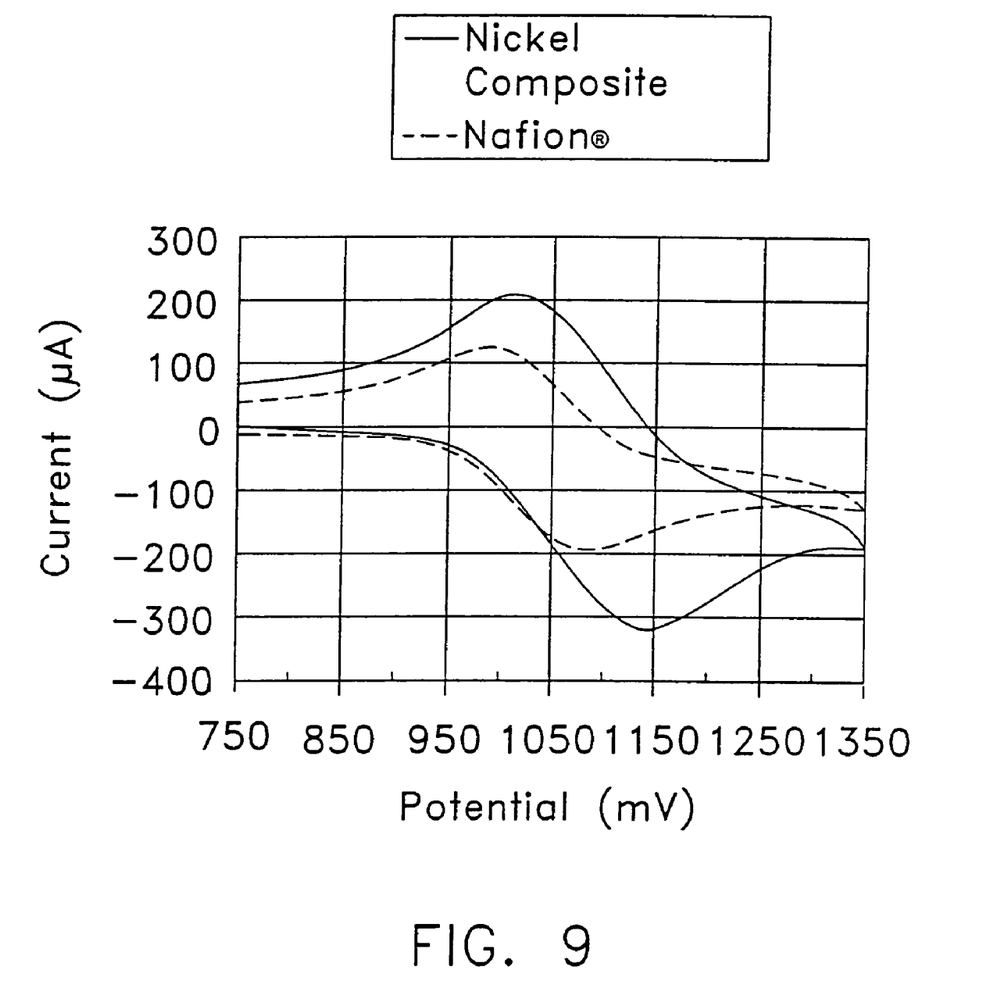
FIG. 9 shows 100 mV/s cyclic voltammograms of tris(2,2'-bipyridyl) ruthenium (II) in a siloxyl coated nickel microparticle/Nafion® composite and a Nafion® film. Nickel electrode data were recorded in an external magnetic field.

Nickel. Siloxyl coated nickel microparticles form composites that look similar to the composites formed from siloxyl coated magnetite microparticles. The main functional difference between the two composites is that nickel is a weaker magnetic material. Nickel microparticles are superparamagnetic, so they only sustain a magnetic field in the presence of an external magnetic field. Therefore, the cyclic voltammogram of the siloxyl coated nickel microparticle/Nafion® composite shown in FIG. 9 is in the presence of a 0.2 T external cylindrical magnet. Because nickel microparticles are less magnetic than magnetite, the flux enhancements for siloxyl coated nickel microparticle/Nafion® composites are less than for siloxyl coated magnetite microparticles/Nafion® composites. The difference in the peak potentials ($\Delta E_p$) are 30 mV larger than the $\Delta E_p$'s for the Nafion® films. The forward peak potential is shifted 58 mV with respect to Nafion® and the backward peak potential is shifted −28 mV with respect to Nafion®.

Summary Data. The results for the cyclic voltammetry are summarized in Table 2. All of the data in Table 2 are adjusted for porosity, except the siloxyl coated samarium cobalt milliparticle and particle data. The clumping of samarium cobalt microparticles because of magnetic attraction, which forms milliparticles, does not allow determination of film porosity. The porosities of the samarium cobalt milliparticle composites are approximately 1.0 because a particle consumes only a small volume of the polymer composite. The siloxyl coated magnetic micromaterials appear to be as stable as the Polysciences microspheres. The silane coated magnetite microparticles, prepared as described herein, show the same flux enhancement as observed for the Polysciences microspheres, within errors of measurement. However, the flux enhancements for siloxyl coated magnetite are more reproducible than the flux enhancements for Polysciences microparticles.

TABLE 2

Flux Enhancements and Peak Shifts for Siloxyl Coated Microparticle/Nafion Composites

| Magnetic Material | Flux Enhancement | Scan Rate mV/s | $\Delta\Delta E_p$ mV | $\Delta E_a$ mV | $\Delta E_c$ mV |
|---|---|---|---|---|---|
| Polysciences Microspheres | 3.4 ± 0.7 | 50 | +15 | +35 | +20 |
| $Sm_2Co_7$ Microparticles | ≅7.6 | 100 | −6 | +30 | −36 |
| $Sm_2Co_7$ Milliparticle | 1.32 ± 0.10 | 100 | ~0 | +15 | −15 |
| Magnetite Microparticles | 3.0 ± 0.4 | 100 | +15 | +48 | −33 |
| Nickel Microparticles | 1.65 ± 0.3 | 100 | +30 | +35 | −28 |

The silane coated nickel composites produce much smaller flux enhancements than the magnetite composites because nickel is a much weaker magnetic material. The nickel microparticles would not be commercially useful in many technological applications because the flux enhancements are so small, and they require the presence of an external magnetic field. However, they might constitute acceptable material for a flux throttle or switch, as can iron and cobalt microparticles.

Figure 6:
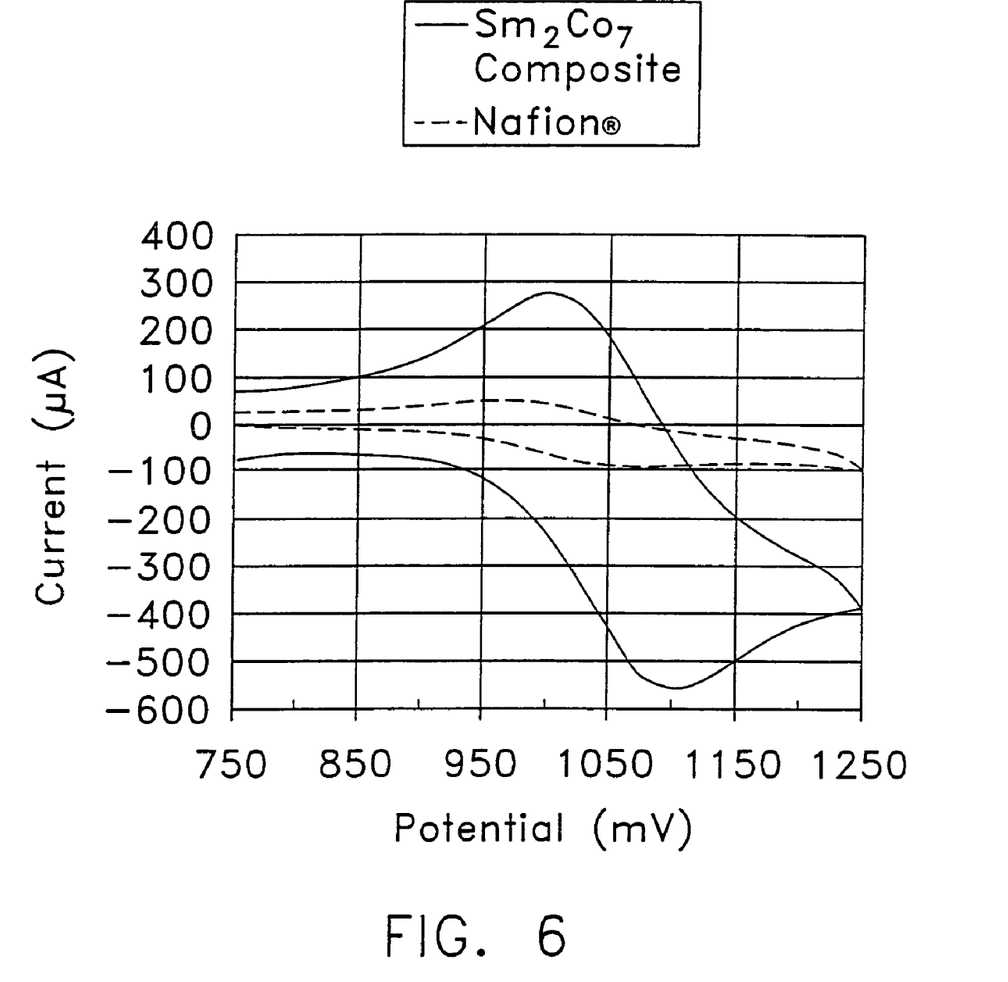
FIG. 6 shows 100 mV/s cyclic voltammograms of tris(2,2'-bipyridyl) ruthenium (II) in a siloxyl coated samarium cobalt microparticle/Nafion® composite and a Nafion® film.

The silane coated samarium cobalt composites have excellent magnetic benefits even if they have engineering difficulties. The large flux enhancement seen in FIG. 5 illustrates the usefulness of this magnetic material. The best illustration of the power of the siloxyl coated samarium cobalt composites is the single particle experiment, results of which are shown in FIG. 6.

The flux enhancements shown in Table 2 increase with magnetic field strength. This is expected because the apparent diffusion coefficient increases linearly with magnetic field in the interface. The peak shifts vary from composite to composite because of the interplay between the magnetic field effects on apparent diffusion coefficients and on heterogeneous electron transfer. Large magnetic fields dramatically increase apparent diffusion coefficients, which generally yield larger $\Delta E_p$ values. Large magnetic field effects on heterogeneous electron transfer reactions increase heterogenous electron transfer rates for paramagnetic species reacting to diamagnetic species, but there is no increase in rate for diamagnetic species reacting to paramagnetic species. The interplay between these two magnetic field effects cause the large variations in peak shifts seen in Table 2.

The foregoing embodiments and advantages are merely exemplary and are not to be construed as limiting the present invention. The present teaching can be readily applied to other types of apparatuses, coating methodologies, and siloxyl coated particle uses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function, and not only structural equivalents but also equivalent structures. For example, additional uses of siloxyl coated magnetic microparticles and siloxyl coated magnetic milliparticles on kinds of electrodes not specifically described herein fall within the intended scope of the present invention. Also, siloxyl coating of metallic particles not specifically disclosed herein fall within the intended scope of the present invention. In addition, uses of siloxyl coated magnetic microparticles not specifically described herein fall within the intended scope of the present invention when they enhance or decrease a magnetically susceptible process of any sort. Furthermore, magnetic and metallic materials not specifically listed herein are intended to be encompassed by the scope of the present invention.

What is claimed is:

1. A method of siloxyl coating metallic particles, comprising the steps of:
    mixing metallic particles with a silane solution to yield a metallic particle-silane solution mixture;
    creating a suspension of said metallic particle-silane solution mixture for a first period of time to yield siloxyl coated metallic particles;
    separating said siloxyl coated metallic particles from said silane solution;
    rinsing said siloxyl coated metallic particles with an organic solvent to yield purified siloxyl coated metallic particles;
    drying said purified siloxyl coated metallic particles;
    mixing said dried and purified siloxyl coated metallic particles with a cross linking solution to yield a siloxyl coated metallic particle-cross linking solution mixture;
    creating a suspension of said siloxyl coated particle-crosslinking solution mixture for a second period of time to yield siloxyl coated and cross linked metallic particles; and
    separating said siloxyl coated and cross linked metallic particles from said cross linking solution.

2. The method of siloxyl coating metallic particles according to claim 1, further comprising the step of:
    rinsing said siloxyl coated and cross linked metallic particles to yield purified siloxyl coated and cross linked metallic particles.

3. The method of siloxyl coating metallic particles according to claim 2, further comprising the step of:
    drying said purified siloxyl coated and cross linked metallic particles.

4. The method of siloxyl coating metallic particles according to claim 1, wherein
    the coating procedure is conducted at about room temperature, and
    said first and second periods of time each independently equal about 4 hours.

5. The method of siloxyl coating metallic particles according to claim 1, wherein said silane solution comprises at least one X—$C_x$-trialkoxysilane, wherein
    X comprises a group reactive toward a cross linking agent, comprising one of amino, amide, thiol, aldehyde, nitrile, sulfonyl, alcohol, carbonyl, carboxy, chloro, an alkoxy, a bromo, an iodo, a sulfonyl, a carbonyl, and a methacryl;
    x equals 1 to about 20;
    $C_x$ is a linear or branched carbon chain that is saturated or unsaturated, and that also can comprise a cyclic group with the proviso that said cyclic group must be separated from the trialkoxysilane moiety by a carbon chain that is at least 2 carbons in length; and trialkoxysilane comprises three alkoxy groups covalently attached to a silane group, and wherein the three alkoxy groups independently can be methoxy, ethoxy, propoxy, butoxy, pentoxy, hexoxy, heptoxy, or phenoxy, wherein the phenoxy may be substituted.

6. The method of siloxyl coating metallic particles according to claim 5, wherein the at least one X—$C_x$-trialkoxysilane comprises 3-aminopropyltrimethoxysilane.

7. The method of siloxyl coating metallic particles according to claim 1, wherein said organic solvent comprises at least one aromatic organic solvent.

8. The method of siloxyl coating metallic particles according to claim 7, wherein said aromatic organic solvent comprises toluene.

9. The method of siloxyl coating metallic particles according to claim 1, wherein said metallic particles comprise metallic microparticles.

10. The method of siloxyl coating metallic particles according to claim 9, wherein said metallic microparticles comprise a range of diameters from about 2 μm to about 10 μm.

11. The method of siloxyl coating metallic particles according to claim 9, wherein said metallic microparticles comprise a range of diameters from about 0.1 μm to about 20 μm.

12. The method of siloxyl coating metallic particles according to claim 9, wherein said metallic microparticles comprise magnetic microparticles.

13. The method of siloxyl coating metallic particles according to claim 12, wherein said magnetic microparticles comprise at least one of an iron oxide, a samarium cobalt, nickel, and a neodymium iron boron.

14. The method of siloxyl coating metallic particles according to claim 1, wherein said metallic particles comprise milliparticles comprising a range of diameters from about 20 μm to about 2 mm.

15. The method of siloxyl coating metallic particles according to claim 1, wherein said cross linking solution comprises at least one of ethylene glycol diglycidyl ether, ethylene glycol dimethacrylate, 2-ethylheryl glycidyl ether, ethylene glycol bis [pentakis (glycidyl allyl ether)] ether, 1,4-butanediol glycidyl ether, 4-tert-butyl phenyl glycidyl ether, N,N'-bis (acryloyl) cystamine, nitrilotriacetic acid tri (N-succinimidyl) ester, and 4-azidophenyl isothiocyanate.

16. The method of siloxyl coating metallic particles according to claim 1, wherein said cross linking solution comprises about 50/50 (vol/vol) of a cross linking agent and a solvent in which said cross linking agent is soluble.

17. The method of siloxyl coating metallic particles according to claim 16, wherein said cross linking agent comprises at least one of ethylene glycol diglycidyl ether, ethylene glycol dimethacrylate, 2-ethylhexyl glycidyl ether, ethylene glycol bis [pentakis (glycidyl allyl ether)] ether, 1,4-butanediol glycidyl ether, 4-tert-butyl phenyl glycidyl ether, N,N'-bis (acryloyl) cystamine, nitrilotriacetic acid tri (N-succinimidyl) ester, and 4-azidophenyl isothiocyanate.

18. The method of siloxyl coating metallic particles according to claim 16, wherein said solvent comprises water.

* * * * *